(12) United States Patent
Shan et al.

(10) Patent No.: US 10,808,884 B2
(45) Date of Patent: Oct. 20, 2020

(54) SELFIE DEVICE

(71) Applicants: Jinghua Shan, Shenzhen (CN); Yi Bing Peng, Shenzhen (CN)

(72) Inventors: Jinghua Shan, Shenzhen (CN); Yi Bing Peng, Shenzhen (CN)

(*) Notice: Subject to any disclaimer, the term of this patent is extended or adjusted under 35 U.S.C. 154(b) by 0 days.

(21) Appl. No.: 16/517,699

(22) Filed: Jul. 22, 2019

(65) Prior Publication Data
US 2020/0217452 A1    Jul. 9, 2020

(30) Foreign Application Priority Data

Jan. 8, 2019    (CN) .................... 2019 2 0028462 U (51) Int. Cl.
| G03B 17/56 | (2006.01) |
| F16M 13/04 | (2006.01) |
| F16M 11/04 | (2006.01) |
| F16M 11/10 | (2006.01) |
| F16M 11/28 | (2006.01) |
| H01F 7/02 | (2006.01) |
| G08C 17/02 | (2006.01) |

(52) U.S. Cl.
CPC .......... *F16M 13/04* (2013.01); *F16M 11/041* (2013.01); *F16M 11/105* (2013.01); *F16M 11/28* (2013.01); *G03B 17/561* (2013.01); *H01F 7/0252* (2013.01); *G08C 17/02* (2013.01)

(58) Field of Classification Search
USPC ....................................................... 396/420
See application file for complete search history.

(56) References Cited

U.S. PATENT DOCUMENTS

| 2016/0091139 A1* | 3/2016 | Levine ................. G03B 17/561 294/139 |
| 2016/0248962 A1* | 8/2016 | Li ...................... H04N 5/23206 |
| 2016/0252799 A1* | 9/2016 | Li .......................... F16M 13/04 396/425 |
| 2018/0066792 A1* | 3/2018 | Chen ..................... F16M 11/10 |

* cited by examiner

*Primary Examiner* — Clayton E. LaBalle
*Assistant Examiner* — Warren K Fenwick (57) ABSTRACT

The present disclosure relates to a field of a shooting support device, and in particular to a selfie device. The selfie device includes a telescopic rod, a tripod handle configured to store the telescopic rod, an upper clamping portion, a lower clamping portion opposite to the upper clamping portion, a clamping arm connected with the upper clamping portion and the lower clamping portion, and a wireless remote. The clamping arm is rotably connected a top end of the telescopic rod. The wireless remote is detachably disposed between the upper clamping portion and the lower clamping portion. The wireless remote is detachably disposed between the upper clamping portion and the lower clamping portion to instead of disposing on the side of a handle. It reduces the radial size of the selfie device, greatly improve the cleanliness of selfie device and convenience for use and carry.

10 Claims, 7 Drawing Sheets

FIG. 8

SELFIE DEVICE

TECHNICAL FIELD

The present disclosure relates to a field of a shooting support device, and in particular to a selfie device.

BACKGROUND

With improvement of science and technology, smartphones are widely used in our daily lives and pixels of the smartphones are increasing. However, there are some limitations in using the smartphones to take photos. If users take a photo by hand, a handheld distance limits scope of photo. Therefore, the selfie device has become a kind of common shooting tool.

At present, a tripod selfie device mainly performs remote control to shoot through a wireless remote on the market. The wireless remote is disposed on a side of a handle, which increases size of the selfie device, and seriously affects an overall appearance of the selfie device. Therefore, the selfie device in a prior art still needs to improve and develop.

SUMMARY

In view of the deficiency of the prior art, the present disclosure provides a selfie device with clean appearance and user-friendly.

A technical scheme of the present disclosure in the following:

The present disclosure provides the selfie device, comprising a telescopic rod, a tripod handle configured to store the telescopic rod, an upper clamping portion, a lower clamping portion opposite to the upper clamping portion, a clamping arm connected with the upper clamping portion and the lower clamping portion, and a wireless remote. The clamping arm is rotably connected a top end of the telescopic rod. The wireless remote is detachably disposed between the upper clamping portion and the lower clamping portion.

Furthermore, a shape of the wireless remote matches with a shape of the tripod handle. The upper clamping portion, the clamping arm, the wireless remote, and the tripod handle integrally form a whole cylindrical shape.

Furthermore, the selfie device further comprises a magnetic component; the magnetic component attaches the wireless remote to the tripod handle.

Furthermore, the magnetic component comprises a first magnetic component disposed on the wireless remote and a second magnetic component disposed on the tripod handle. The second magnetic component is opposite to the first magnetic component.

Furthermore, a first anti-skid groove and a second anti-skid groove are symmetrically disposed on the upper clamping portion and the lower clamping portion. The wireless remote is clamped between the first anti-skid groove and the second anti-skid groove.

Furthermore, a first groove and a second groove are respectively disposed on two ends of the wireless remote. The first groove and the second groove match with the first anti-skid groove and the second anti-skid groove.

Furthermore, a mounting surface is disposed on the wireless remote and the mounting surface matches with a side surface of the tripod handle.

Furthermore, further comprising a clamping arm and a connector of the telescopic rod. The connector comprises a base rotably connected to a top end of the telescopic rod, a connecting arm is disposed on a side of the base. The clamping arm is rotated and disposed on the connecting arm.

Furthermore, a sliding groove is disposed on the clamping arm. A slider is sliding disposed on the sliding groove. The slider is rotably connected with the connecting arm.

Furthermore, the tripod handle comprises three supporting legs and a mounting ring; the three supporting legs is rotated and disposed on the mounting ring. The mounting ring is sliding and sleeved on an outside of the telescopic rod.

The beneficial effect of the present disclosure is: the wireless remote is detachably disposed between the upper clamping portion and the lower clamping portion, instead of disposing on the side of the handle, which reduces the radial size of the selfie device, greatly improves the cleanliness of the selfie device, and is convenience to use and carry.

DETAILED DESCRIPTION

An embodiment of a present disclosure provides a selfie device. A purpose, technical scheme and effect in the embodiments of the present disclosure are clearly and completely described in the following with reference to the drawings and embodiments. It should be understood that the specific embodiments described herein are merely illustrative the present disclosure and the embodiments are not intended to limit the present disclosure.

The embodiment of the present disclosure provides a selfie device, as shown in FIGS. 1-8, the selfie device includes a telescopic rod 2, a tripod handle 1 configured to store telescopic rod, an upper clamping portion 4, a lower clamping portion 5 opposite to the upper clamping portion 4, a clamping arm 6 connected with the upper clamping portion 4 and the lower clamping portion 5, and a wireless remote 7. The clamping arm 6 is rotably connected a top end of the telescopic rod 2. The wireless remote 7 is detachably disposed between the upper clamping portion 4 and the lower clamping portion 5. The wireless remote 7 is detachably disposed between the upper clamping portion 4 and the lower clamping portion 5 to instead of disposing on the side of a handle. It reduces the radial size of the selfie device, greatly improve the cleanliness of selfie device and convenience for use and carry. Further, the wireless remote 7 is disposed between the upper clamping portion 4 and the lower clamping portion 5. When the selfie device is stored and carried, it can effectively reduce wear of the wireless remote 7 and improve the service life of the wireless remote 7.

Further, as shown in FIGS. 1, 2, 7 and 8, a shape of the wireless remote matches with a shape of the tripod handle are matched. The upper clamping portion 4, the clamping arm 6, the wireless remote 7 and the tripod handle 1 integrally form a whole cylindrical shape. In the embodiment, when the selfie device is stored and carried, the lower clamping portion 5 is stored inside the tripod handle 1. An upper end of a mounting ring 12 matches with a lower end of the upper clamping portion. At the same time, the shape contours among the tripod handle 1, the wireless remote 7, the clamping arm 6 and upper clamping portion 4 are matched and composed of a regular cylindrical selfie device. The regular cylindrical selfie device carries easily, beautiful and enhance the user experience.

Figure 1:
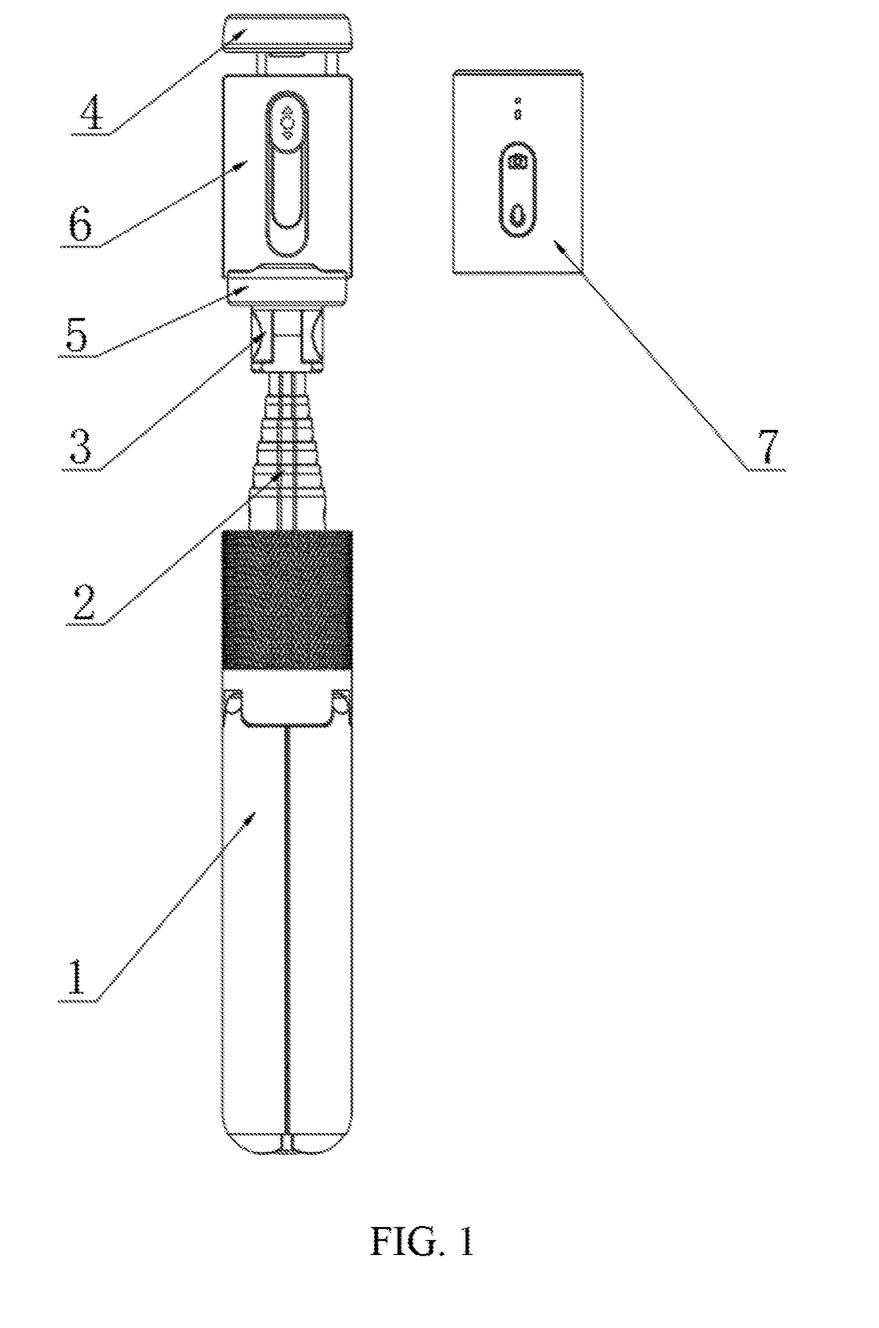
FIG. 1 is an exploded structural diagram of a selfie device of an embodiment of the present disclosure.
Figure 2:
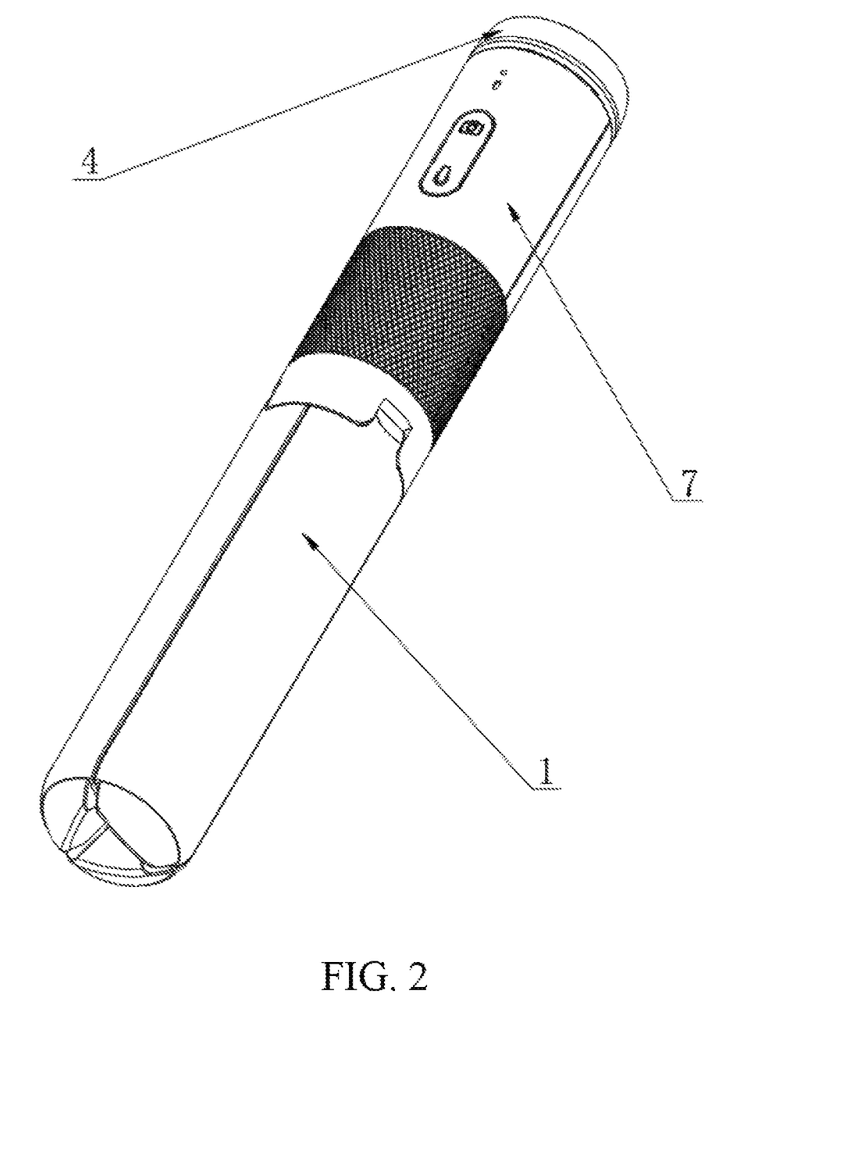
FIG. 2 is a folded structural diagram of the selfie device of the embodiment of the present disclosure.
Figure 3:
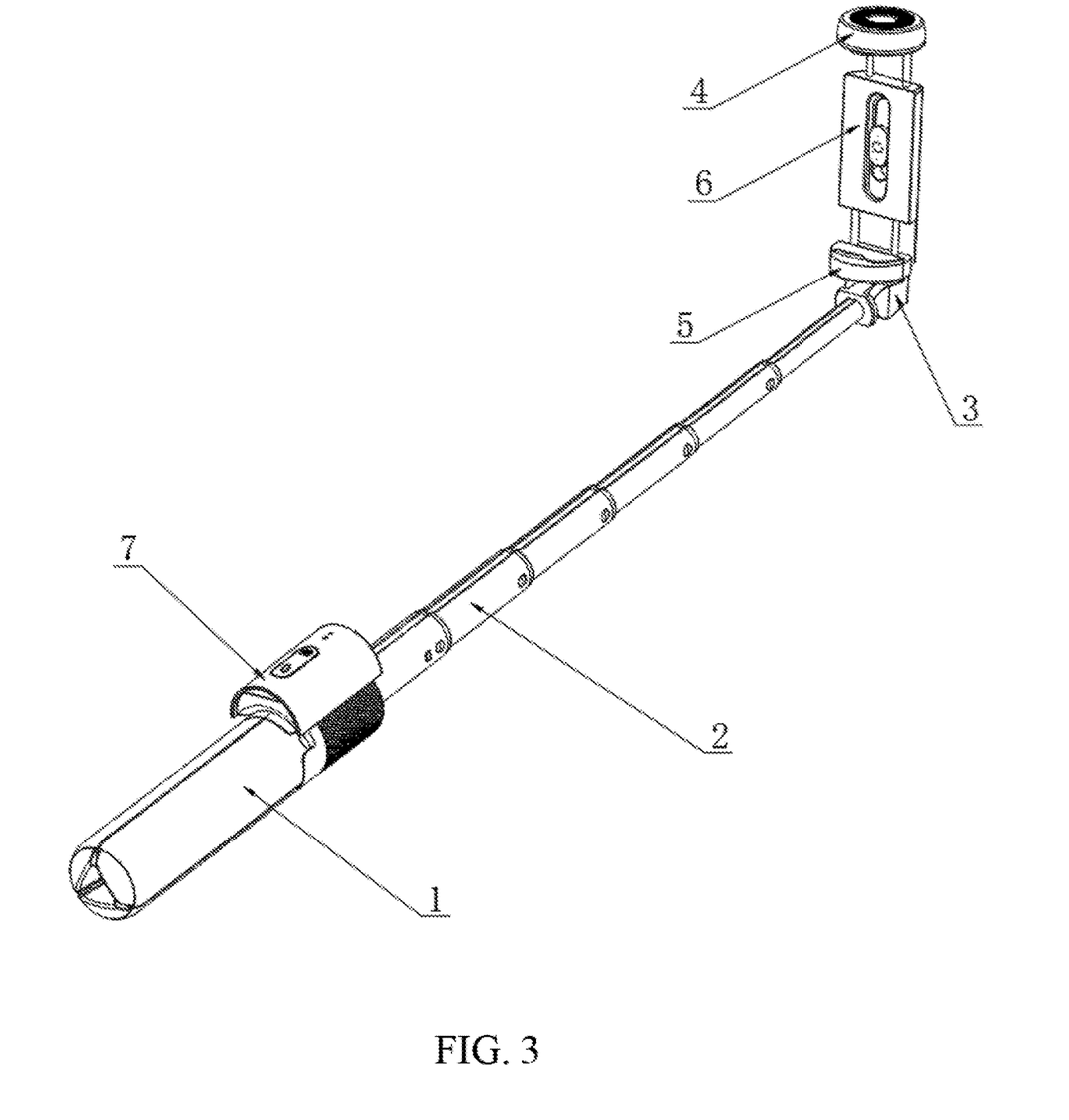
FIG. 3 is a handheld structural diagram of the selfie device of the embodiment of the present disclosure.

Further, as shown in FIG. 3, the selfie device further includes a magnetic component. The magnetic component attaches the wireless remote to the tripod handle. The magnetic component includes a first magnetic component disposed on the wireless remote 7 and a second magnetic component disposed on the tripod handle 1. The second magnetic component is opposite to the first magnetic component. The first magnetic component and the second magnetic component cab be a magnet and a suction plate, which the magnet and the suction plate are attracted to each other. One of the magnets or suction plates is disposed on the side of the tripod handle 1, another one of the magnets or suction plates is disposed on the wireless remote 7. The wireless remote 7 attaches on the side of the tripod handle 1 through the magnet and the suction plate are attracted to each other. When the user takes selfie in a handheld selfie device, the convenience of the selfie is improved through the wireless remote 7 is disposed on the side of the tripod handle 1. In the embodiment, the suction plate can be an iron plate etc. which are attracted to each other with the magnet.

Figure 4:
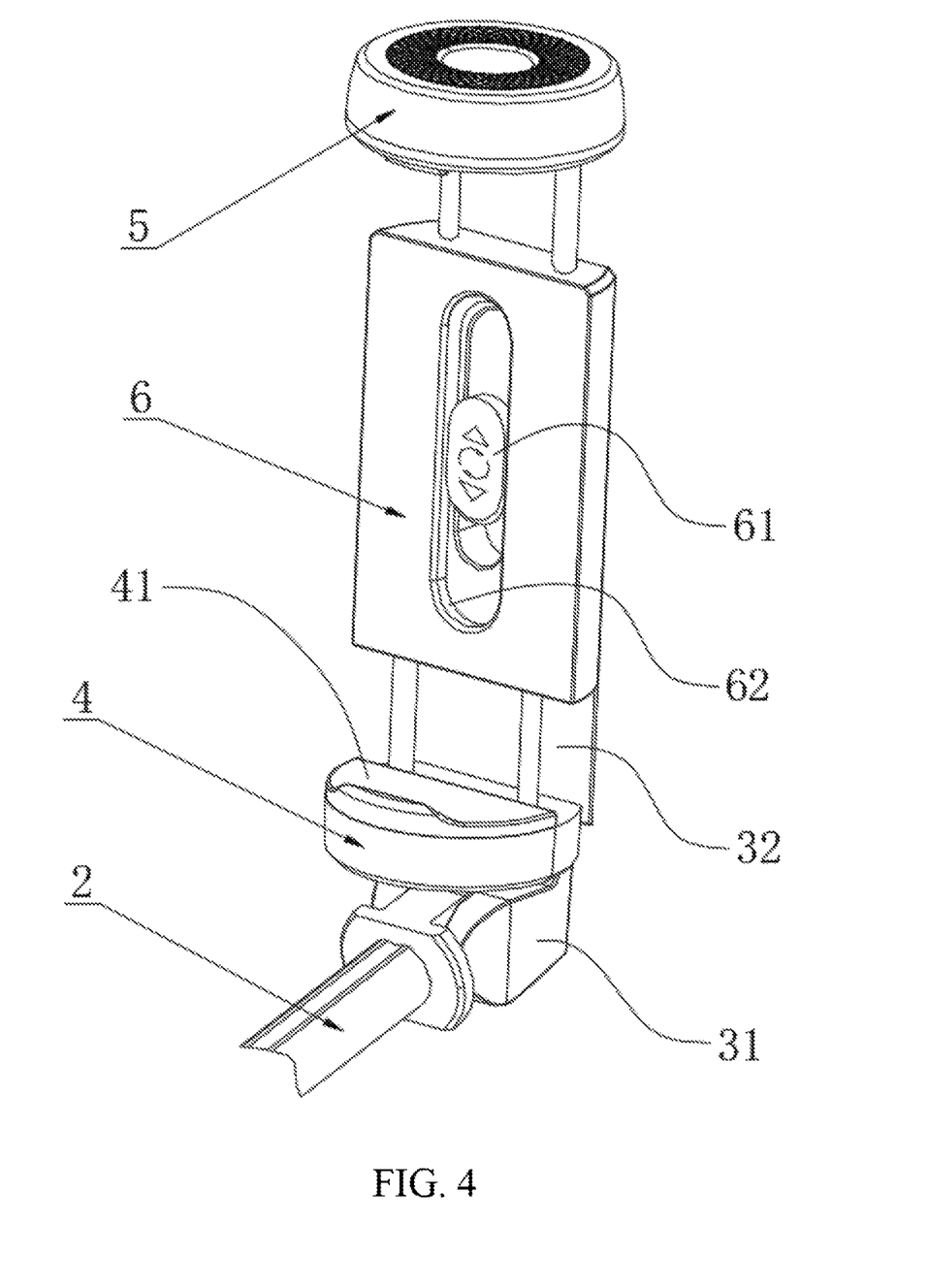
FIG. 4 is a partial structure amplification diagram of FIG. 3.
Figure 5:
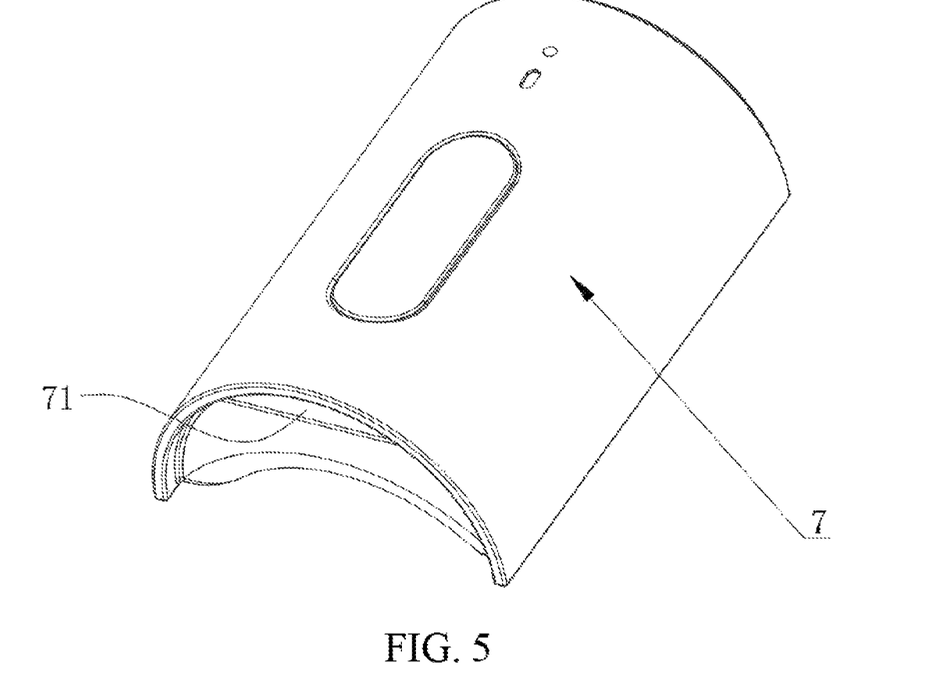
FIG. 5 is a structural schematic diagram of a wireless remote of the embodiment of the present disclosure.

Further, as shown in FIGS. 3 and 4, a first anti-skid groove 41 and a second anti-skid groove (not shown in the drawings) are symmetrically disposed on the upper clamping portion 4 and the lower clamping portion 5, which improves the stability when the upper clamping portion 4 and the lower clamping portion 5 hold the shooting device, and effectively prevents the shooting device from loosely falling to damage the shooting device.

Further, as shown in FIGS. 1, 2, 3 and 4, the wireless remote 7 is clamped between the first anti-skid groove 41 and the second anti-skid groove, which enhances the install and detach of the wireless remote 7. At the same time, it can ensure the engaging stability of the wireless remote 7 and prevent the loosen and falling of the wireless remote 7.

Further, as shown in FIGS. 1, 3, 4, 5 and 6, a first groove 71 and a second groove 72 are respectively disposed on two ends of the wireless remote 7, which the first groove 71 and the second groove 72 match with the first anti-skid groove 41 and the second anti-skid groove. The first groove 71 and the second groove 72 are coupled with the first anti-skid groove 41 and the second anti-skid groove increase, which further improving the stability of engage and user experience.

Figure 6:
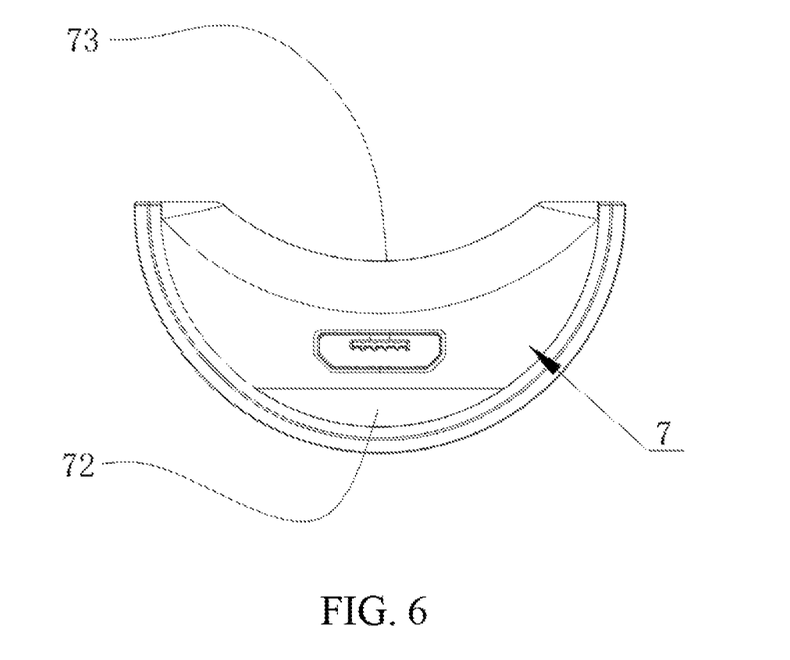
FIG. 6 is a structural schematic diagram showing another angle of the wireless remote of the embodiment of the present disclosure.

Further, as shown in FIGS. 3 and 6, a mounting surface 73 is disposed on the wireless remote 7. The mounting surface matches with a side surface of the tripod handle 1 which the wireless remote is closely disposed in the tripod handle 1. A distance between the wireless remote 7 and the tripod handle 1 is reduced and a magnetic absorption force is improved. That is, the stability of the wireless remote 7 dispose on the side of the tripod handle 1 is improved.

Further, as shown in FIGS. 3, 4, 7 and 8, the selfie device further includes a clamping arm 6 and a connector 3 of the telescopic rod 2. The connector 3 includes a base 31 rotably connected to a top end of the telescopic rod 2, a connecting arm 32 is disposed on a side of the base 31. The clamping arm 6 is rotably connected on the connecting arm 32. The clamping arm 6 is rotably connected on the connecting arm 32, and the selfie device can rotate a shooting device from a horizontal shooting to a vertical shooting, which can meet user multiple shooting requirements.

Further, as shown in FIGS. 3 and 4, a sliding groove 61 is disposed on the clamping arm 6. A slider 62 is slide and disposed on the sliding groove 61. The slider 62 is rotably connected with the connecting arm 32 which the selfie device can easily horizontal adjust the shooting angle after the selfie device is clamped. Since the slider 62 is slide and disposed on the sliding groove 61, the selfie device can easily accommodate itself to reduce the size of the selfie device, and carry and use easily. In the embodiment, the slider 62 is a waist-shape slider. The selfie device can adjust the shooting angle through the slider 62 as the waist-shape slider. The slider 62 rotates with the clamping arm 6 together, thereby, improving the stability of the selfie device.

Figure 7:
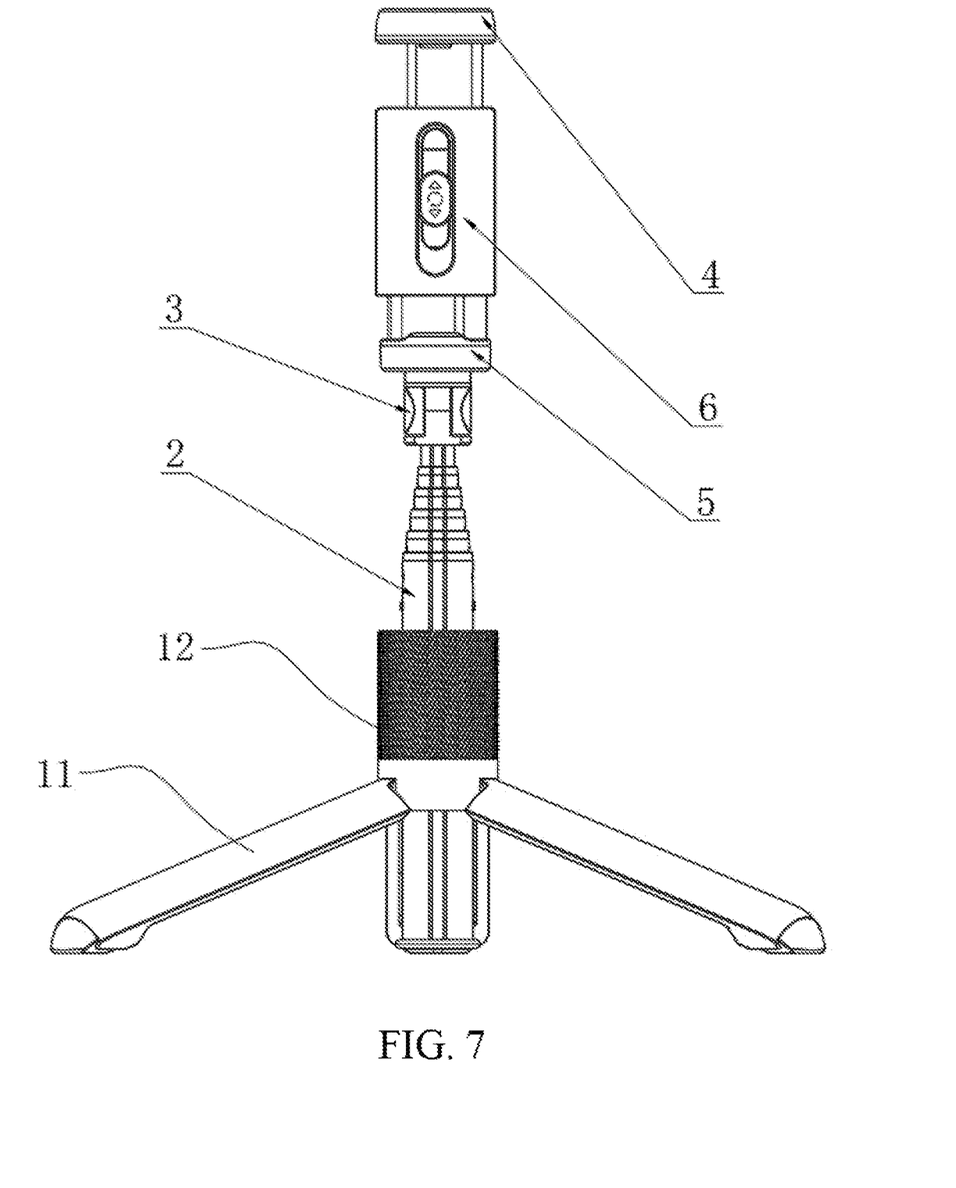
FIG. 7 is a vertical clamping structural diagram of a tripod selfie device of the embodiment of the present disclosure.
Figure 8:
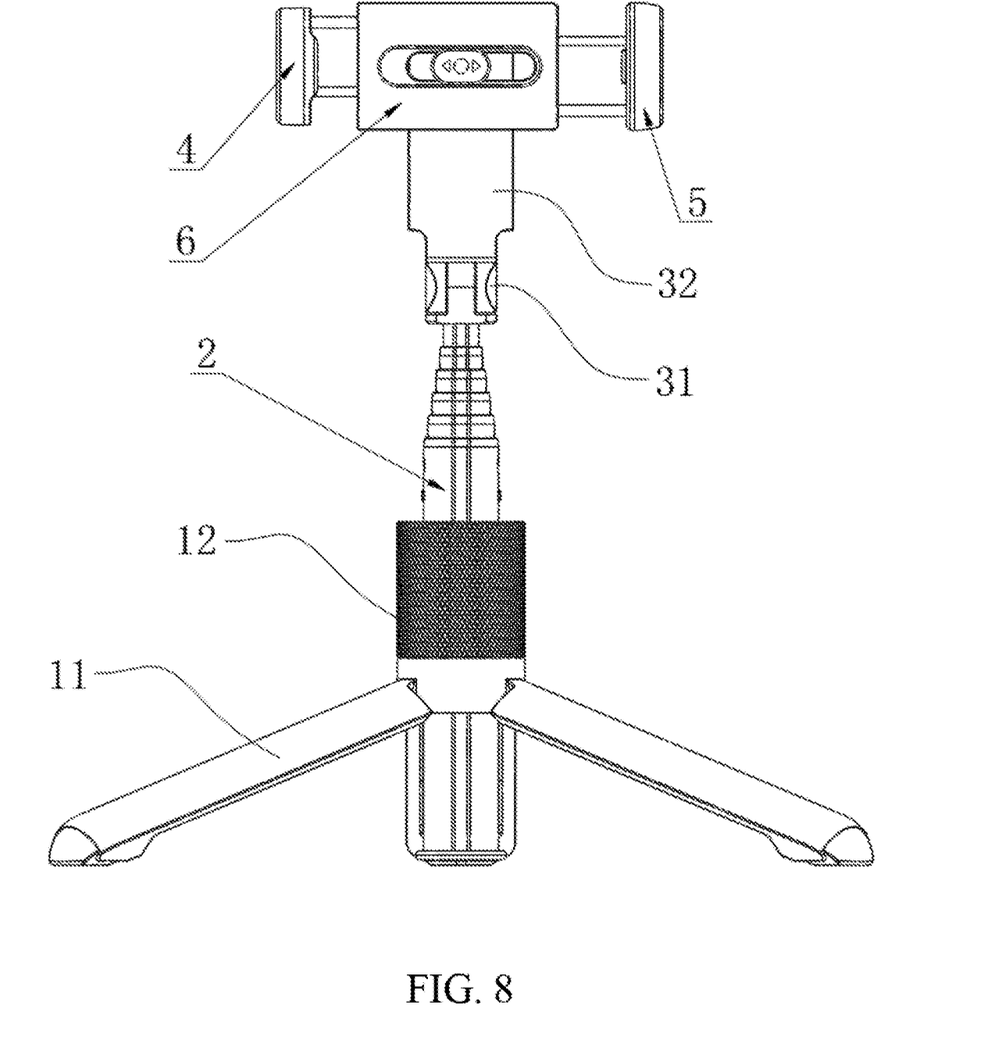
FIG. 8 is a horizontal clamping structural diagram of the tripod selfie device of the embodiment of the present disclosure.

Further, as shown in FIGS. 7 and 8, the tripod handle 1 includes three supporting legs 11 and a mounting ring 12. The three supporting legs 11 is rotated and disposed on the mounting ring 12. The mounting ring 12 is sliding and sleeved on an outside of the telescopic rod 2. Since the three support legs is rotated and disposed on the mounting ring 12, when a tripod mode for selfie is used, the three supporting legs 11 is unfolded for use; When stored or carried or handheld selfie, the three supporting legs 11 are rotated to close the telescopic rod, therefore, the tripod handle can storage or handheld use, and it is convenient and fast.

It should be understood that the embodiment of the present disclosure is not limited to the above examples. Those skilled in the art can improve or modify according to the above description. All such improvements and modifications are intended to be included within the protective scope of the appended claims of the present disclosure.

The invention claimed is:

1. A selfie device, comprising:
a telescopic rod, a tripod handle configured to store the telescopic rod, an upper clamping portion, a lower clamping portion opposite to the upper clamping portion, a clamping arm connected with the upper clamping portion and the lower clamping portion, and a wireless remote;
wherein the clamping arm is rotatably connected to a top end of the telescopic rod the wireless remote is detachably disposed between the upper clamping portion and the lower clamping portion.

2. The selfie device according to claim 1, wherein a shape of the wireless remote matches with a shape of the tripod handle; the upper clamping portion, the clamping arm, the wireless remote, and the tripod handle integrally form a whole cylindrical shape.

3. The selfie device according to claim 1, wherein the selfie device further comprises a magnetic component; the magnetic component attaches the wireless remote to the tripod handle.

4. The selfie device according to claim 3, wherein the magnetic component comprises a first magnetic component disposed on the wireless remote and a second magnetic component disposed on the tripod handle; the second magnetic component is opposite to the first magnetic component.

5. The selfie device according to claim 4, wherein a first groove and a second groove are respectively disposed on two ends of the wireless remote; the first groove and the second groove match with the first anti-skid groove and the second anti-skid groove.

6. The selfie device according to claim 3, wherein a mounting surface is disposed on the wireless remote and the mounting surface matches with a side surface of the tripod handle.

7. The selfie device according to claim 1, wherein a first anti-skid groove and a second anti-skid groove are symmetrically disposed on the upper clamping portion and the lower clamping portion; the wireless remote is clamped between the first anti-skid groove and the second anti-skid groove.

8. The selfie device according to claim 1, further comprising a clamping arm and a connector of the telescopic rod; the connector comprises a base rotably connected to a top end of the telescopic rod, a connecting arm is disposed on a side of the base; the clamping arm is rotated and disposed on the connecting arm.

9. The selfie device according to claim 8, wherein a sliding groove is disposed on the clamping arm; a slider is sliding disposed on the sliding groove; the slider is rotably connected with the connecting arm.

10. The selfie device according to claim 1, wherein the tripod handle comprises three supporting legs and a mounting ring; the three supporting legs is rotated and disposed on the mounting ring; the mounting ring is sliding and sleeved on an outside of the telescopic rod.

* * * * *